US011555292B2

(12) United States Patent
Carlyle

(10) Patent No.: US 11,555,292 B2
(45) Date of Patent: Jan. 17, 2023

(54) HEAVY EQUIPMENT BOOM SYSTEM AND METHOD AND HYDRAULIC CIRCUIT THEREFOR

(71) Applicant: Tigercat Industries Inc., Brantford (CA)

(72) Inventor: Michael Wayne Carlyle, Paris (CA)

(73) Assignee: TIGERCAT INDUSTRIES INC., Brantford (CA)

(*) Notice: Subject to any disclaimer, the term of this patent is extended or adjusted under 35 U.S.C. 154(b) by 0 days.

(21) Appl. No.: 17/134,623

(22) Filed: Dec. 28, 2020

(65) Prior Publication Data

US 2021/0115648 A1    Apr. 22, 2021

Related U.S. Application Data

(63) Continuation of application No. PCT/CA2018/050801, filed on Jun. 28, 2018.

(51) Int. Cl.
*E02F 9/22* (2006.01)
*E02F 3/43* (2006.01)
(Continued)

(52) U.S. Cl.
CPC ............ *E02F 9/2217* (2013.01); *E02F 3/435* (2013.01); *F15B 11/20* (2013.01); *F15B 13/06* (2013.01); *F15B 21/14* (2013.01)

(58) Field of Classification Search
CPC ........... E02F 3/435; F15B 11/20; F15B 13/06; F15B 21/14
See application file for complete search history.

(56) References Cited

U.S. PATENT DOCUMENTS 3,927,781 A * 12/1975 Okabe .................... E02F 3/308
                                                          414/715
4,504,185 A *  3/1985 Yagyu .................... F15B 11/20
                                                          414/700
(Continued)

FOREIGN PATENT DOCUMENTS

EP      0722018 B1    10/2001
WO   2008013466 A1     1/2008

OTHER PUBLICATIONS

Extended European Search Report, European Patent Office, corresponding EP Patent Application No. 18924024.5, dated Jun. 10, 2022.
(Continued)

*Primary Examiner* — Michael Leslie
*Assistant Examiner* — Matthew Wiblin
(74) *Attorney, Agent, or Firm* — David J. Schnurr

(57) ABSTRACT

A boom system including a hoist boom pivoted to a machine base; a stick boom having a proximal end pivoted to the hoist boom and a distal end configured to carry a working tool; at least one hydraulic hoist cylinder mounted between the machine base and the hoist boom; a first stick cylinder mounted between the hoist boom and the stick boom; a second stick cylinder mounted similarly and mechanically linked with the first stick cylinder; and a hydraulic circuit for supplying hydraulic fluid to the hoist cylinder and stick cylinders, wherein the hydraulic circuit includes a hydraulic conduit line connecting a base end of the at least one hoist cylinder with a base end of the second stick cylinder to allow hydraulic fluid to shunt between the base ends of the hoist cylinder and the second stick cylinder.

17 Claims, 5 Drawing Sheets

(51) Int. Cl.
*F15B 13/06* (2006.01)
*F15B 21/14* (2006.01)
*F15B 11/20* (2006.01)

(56) References Cited

U.S. PATENT DOCUMENTS

| | | | |
|---|---|---|---|
| 6,443,196 B1 | 9/2002 | Kurelek | |
| 6,557,453 B2* | 5/2003 | Paakkunainen | F15B 11/20 91/536 |
| 6,763,863 B2 | 7/2004 | Liu | |
| 7,007,728 B2 | 3/2006 | Kurelek | |
| 2001/0032542 A1* | 10/2001 | Heikkila | E02F 3/384 91/508 |
| 2004/0011427 A1 | 1/2004 | Liu | |
| 2005/0045245 A1 | 3/2005 | Kurelek | |
| 2010/0090638 A1* | 4/2010 | Saunders | F15B 11/20 91/191 |
| 2011/0318157 A1 | 12/2011 | Okamura et al. | |
| 2013/0074486 A1 | 3/2013 | McWethy et al. | |
| 2014/0305012 A1 | 10/2014 | O'Donnell | |
| 2015/0030424 A1* | 1/2015 | Stulen | B66C 23/54 414/680 |
| 2017/0073933 A1 | 3/2017 | Tanaka et al. | |
| 2018/0112686 A1 | 4/2018 | Roberti | |
| 2019/0010966 A1* | 1/2019 | Bellows | A01G 23/081 |

OTHER PUBLICATIONS

Office Action from Corresponding Chile Pat. App. No. 3393-2020; Chile Patent Office; dated Nov. 11, 2021.
Partial Supplementary European Search Report, European Patent Office, corresponding EP Patent Application No. 18924024.5, dated Feb. 23, 2022.

* cited by examiner

HEAVY EQUIPMENT BOOM SYSTEM AND METHOD AND HYDRAULIC CIRCUIT THEREFOR

FIELD

This disclosure relates to a heavy equipment boom system and method and a hydraulic circuit therefor. More particularly, the disclosure relates to a boom system for providing adaptable control of a heavy equipment boom using hydraulics.

BACKGROUND

Heavy equipment booms are used in a variety of industries and applications. The boom is a structure extending from a machine base that allows the machine base to move a tool at the end of the boom in at least two dimensions (typically horizontally and vertically or some combination thereof) so that the tool can be used for various purposes such as cutting, digging, or the like. In cases where the boom moves in two dimensions, the machine base can typically swivel to allow movement of the tool in a third dimension.

A boom typically includes a "hoist boom" having a proximal end pivoted to the machine base, and a "stick boom" having a proximal end pivoted to the distal end of the hoist boom. The tool is mounted on the distal end of the stick boom. The boom has one or more hoist hydraulic cylinder(s) typically located below the hoist boom and pinned between the hoist boom and the machine base. One or more stick hydraulic cylinder(s) is typically located below both boom members and pinned to the hoist boom and the stick boom. Cylinders are typically mounted below boom members to be better protected from environmental debris, such as falling trees. Direct pinning without linkages reduces complexity and wearing parts. However, there may be situations where the cylinders are mounted above the boom members and or connected by linkages.

Depending on the particular application, the boom can be involved in raising and lowering the tool, moving the tool horizontally forward and backward, rotating the tool, and in some cases, placing the tool/boom end on the ground to support the base and/or lift and rotate the base. This type of boom with a hoist boom and stick boom is sometimes referred to as a two-member knuckle boom.

A particular concern in some industries, such as the tree harvesting industry, is the amount of diesel fuel that is consumed in some arrangements. Another concern is to improve the machine operator's ability to control tool travel at a controlled velocity, as easily as possible. The technologies described in U.S. Pat. Nos. 6,443,196, 6,681,818, 6,763,863, 6,997,221, and 7,007,728 provide for a system for hydraulically controlling a boom to reduce fuel usage and also provide horizontal tool movement.

The noted patents describe systems for transferring pressurized fluid directly from the collapsing hoist cylinder working (pressurized, load-supporting) end to the extending cylinder working (pressurized, load-supporting) end (or vice-versa), where the fluid continues to do useful load support work. Thus the load-carrying work is separated from the reach positioning function of the knuckle boom, and is left with the hoist and stick cylinders. In these patents, in some cases, reaching movement is controlled by a reach cylinder. In others, reaching movement is controlled by a pump to control transferring of a slug of pressurized hydraulic fluid between the hoist and stick cylinders, or by other means as described therein.

However, there remains a need for an improved heavy equipment boom system and hydraulic system therefor that improves on or overcomes at least some limitations of prior systems.

SUMMARY

It is an object of the embodiments herein to improve on previous boom systems and methods and hydraulic systems therefor and/or obviate or mitigate at least one disadvantage of previous systems and methods.

According to one aspect herein, there is provided a boom system for a heavy equipment machine having a machine base, the system including a hoist boom having a proximal end pivoted to the machine base, and a distal end remote therefrom; a stick boom having a proximal end pivoted to the distal end of the hoist boom and a distal end configured to carry a working tool; at least one hydraulic hoist cylinder mounted between the machine base and the hoist boom; a first stick cylinder mounted between the hoist boom and the stick boom; a second stick cylinder mounted between the hoist boom and the stick boom and mechanically linked with the first stick cylinder; and a hydraulic circuit for operatively supplying hydraulic fluid to the hoist cylinder and stick cylinders, wherein the hydraulic circuit includes at least one hydraulic conduit line connecting a base end port of the at least one hoist cylinder with a base end port of the second stick cylinder so as to allow hydraulic fluid to shunt between the base end of the at least one hoist cylinder and the second stick cylinder.

In some cases, the boom system may further include a high flow valve on a line returning hydraulic fluid to a fluid tank.

In some cases, the boom system may further include a control system for controlling the hydraulic circuit. In these cases, the control system may include a controller, a first cylinder valve for controlling fluid flow to the first stick cylinder and to a rod end of the second stick cylinder, and a second cylinder valve for controlling fluid flow to the at least one hoist cylinder and to a base end of the second stick cylinder.

In some cases, the at least one hoist cylinder may include two or more hoist cylinders.

According to another aspect herein, there is provided a boom system for a machine base, the system including: a hoist boom having a proximal end pivoted to the machine base, and a distal end remote therefrom; a stick boom having a proximal end pivoted to the distal end of the hoist boom and a distal end configured to carry a tool; at least one hydraulic hoist cylinder mounted between the machine base and the hoist boom; a first stick cylinder mounted between the hoist boom and the stick boom; a second stick cylinder mounted between the hoist boom and the stick boom and mechanically linked with the first stick cylinder; and a hydraulic circuit for operatively supplying hydraulic fluid to the hoist and stick cylinders, wherein the hydraulic circuit may include two switching valves for independently switching the base and rod ends of the second stick cylinder among two or more modes of operation.

In some cases, at least one mode of operation may include the switching valves being controlled such that a base end port of the at least one hoist cylinder is connected with a base end port of the second stick cylinder so as to allow hydraulic fluid to shunt between the base end of the at least one hoist cylinder and the second stick cylinder.

In some cases, at least one other mode of operation may include the two switching valves being controlled such that a base end port of the at least one hoist cylinder is connected with a base end port of each of the first and second stick cylinder so as to allow hydraulic fluid to shunt between the base end of the at least one hoist cylinder and the first and second stick cylinders.

The boom system may further include a high flow valve on a line returning hydraulic fluid to a fluid tank.

The boom system may further include a manifold for housing the switching valves. In this case, the manifold may also house the high flow valve.

The boom system may further include a control system for controlling the hydraulic circuit, including the switching valves. In these cases, the control system may include a controller for controlling a first cylinder valve, and a second cylinder valve for controlling fluid flow to the cylinders and switching valves for controlling the fluid flow to base and rod ends of select cylinders, such as the first and second stick cylinders.

According to another aspect herein, there is provided a heavy equipment machine including either of the boom systems described above.

According to another aspect herein, there is provided a method for operating a boom of a heavy equipment machine, the method including: selecting, via a controller, a mode of operation, wherein the modes of operation comprise: a standard mode, an ER mode and a semi-ER mode; and adjusting, via the controller, one or more valves to configure the valves for the selected mode of operation.

In some cases, the adjusting may include switching rod and base ends of one or more stick cylinders via a cartridge valve.

Other aspects and features will become apparent to those ordinarily skilled in the art upon review of the following description of specific embodiments in conjunction with the accompanying figures.

BRIEF DESCRIPTION OF THE DRAWINGS

Embodiments will now be described, by way of example only, with reference to the attached Figures, wherein.

DETAILED DESCRIPTION

Generally, embodiments herein provide a system and method for improved functionality of a heavy equipment boom. Embodiments of the system and method include an improved hydraulic circuit that allows for extended or variable functions to be performed by the boom.

Figure 1:
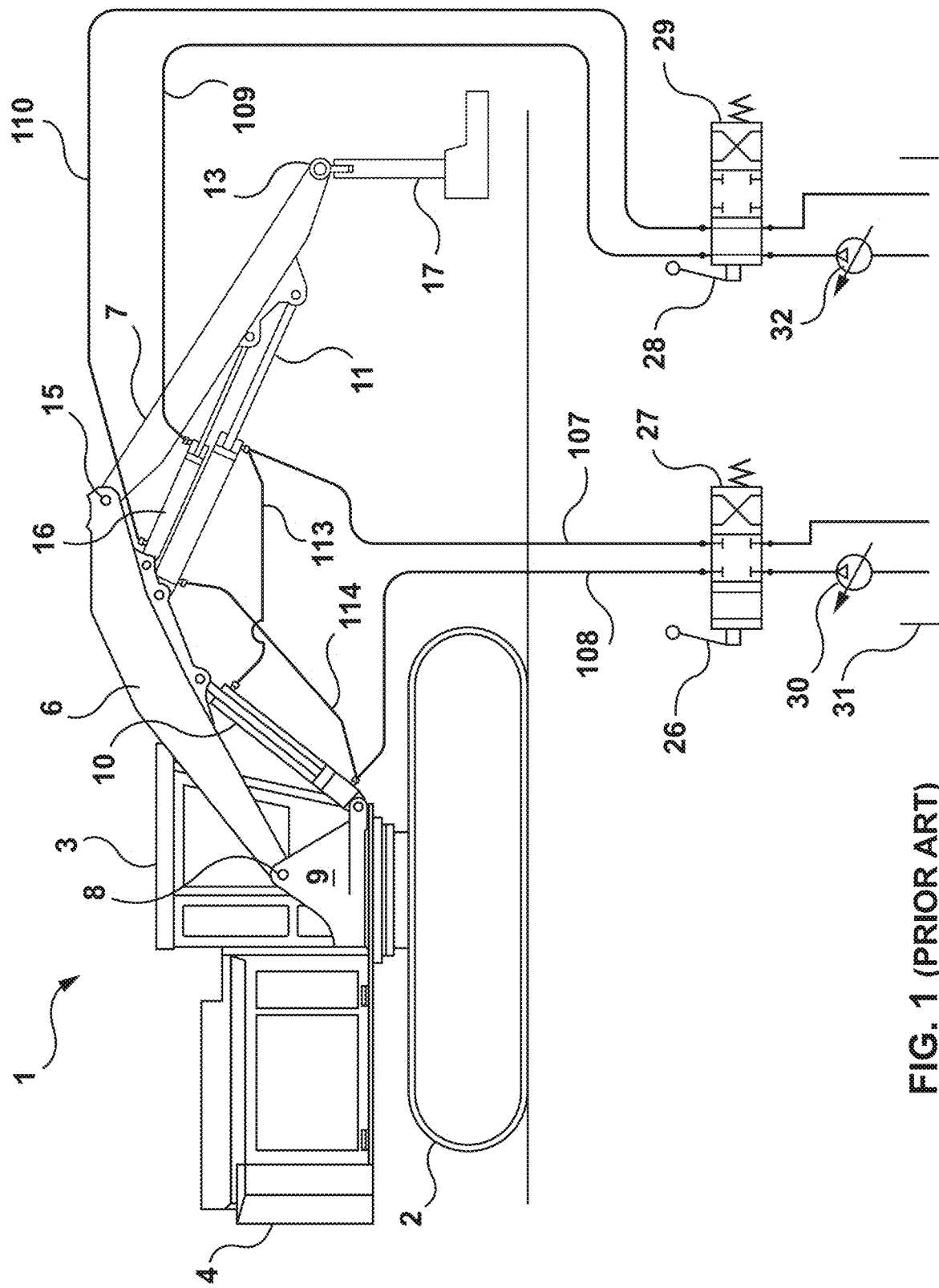
FIG. 1 is a side elevation view showing a piece of heavy equipment and a boom system and hydraulic circuit.

FIG. 1 illustrates a boom system/assembly similar to that of the boom assembly shown in U.S. Pat. No. 6,443,196. A machine base 1 includes vehicle tracks 2 (which could alternatively or also include wheels), an operator's cab 3, and an engine 4 (typically a diesel engine). The boom assembly includes a hoist boom 6, and a stick boom 7. The hoist boom is pivotally mounted relative to the machine base 1 at a hoist-base pivot pin 8 on a mounting bracket 9 secured to the machine base. The stick boom is pivotally connected to the distal end of the hoist boom at a hoist-stick pivot pin 15. The hoist boom is actuated by at least one hydraulic hoist cylinder 10 connected between the machine base and the hoist boom, at an effective angle relative to the hoist boom. The stick boom is actuated by at least one stick cylinder 11 connected between the hoist boom and the stick boom, at an effective angle relative to the stick boom. A tool, such as a tree harvesting head 17 (not shown in detail), is carried at the distal end of the stick boom. There may also be hydraulic or other components that can be used to move/operate the tool but these are not shown in FIG. 1.

While the embodiments described herein tend to focus on the forestry industry and forestry equipment, one of skill in the art will understand that embodiments herein may be implemented in other heavy equipment booms that may be equipped with other types of tools. For example, heavy equipment booms used in construction, mining, or the like.

As can be seen in the superimposed hydraulic circuit in FIG. 1 (sometimes referred to as an ER circuit), which is similar to the hydraulic circuit of U.S. Pat. No. 6,443,196, a lift valve 27 and a reach valve 29 are provided in connection with the hoist and stick cylinders 10, 11. Conduits 107 and 108 connect the ports of the hoist cylinder 10 to the work ports of valve 27 and thereby to a pump 30. However, the stick cylinder 11 is not connected at all to valve 29, but instead is connected by means of conduit 114 to conduit 108, which in effect unites the base end volume of the hoist cylinder 10 with the base end volume of the stick cylinder 11. That is, the hoist cylinder and stick cylinder base ends are piped together and to a valve work port with hydraulic conduit, so that they share a common load-supporting pressurized volume or "slug" of hydraulic fluid/oil behind their pistons. With a routine calculation in selecting appropriate rod and piston diameter sizes, as is known in the art, conduits 107 and 113 can be used to similarly provide a hydraulic connection to the rod end ports of the hoist cylinder 10 and stick cylinder 11. However, this connection is optional as it is the load-supporting hydraulic fluid, i.e. the fluid in the base ends of the hoist and stick cylinders, which is more important.

Thus the lift valve 27 controls the volume of the hydraulic fluid slug which is free to shuttle between the base ends of the hoist and stick cylinders (and between the rod ends of those cylinders, if connected so that this is applicable to them as well). Examining this situation, one can see that, ignoring friction, there is nothing in this hoist and stick cylinder arrangement which prevents free in and out reaching motion of the boom. All that happens as the boom is retracted or extended is that the slug of fluid flows back and forth freely between the respective cylinders. Thus as the boom extends, hydraulic fluid leaves the base end of the hoist cylinder so that it retracts, and shuttles to the base end of the stick cylinder so that it extends. At the same time, of course, hydraulic fluid leaves the rod end of the stick cylinder, and shuttles to the rod end of the hoist cylinder.

The hydraulic circuit uses the reach valve 29 (via reach control lever 28) to control a reach cylinder 16 to adjust and set the stick-to-hoist boom angle, and thus control the reach. The reach valve 29 is connected with pump 32, which may be the same as or different from the pump 30. The pumps 30 and 32 may be driven by the engine 4. The reach cylinder does not primarily support the loads, as that is accomplished by the slug in the hoist and stick cylinders; the reach cylinder alters the angle between the stick boom and the hoist boom.

FIG. 1 illustrates how both the stick and hoist cylinders are made to stroke simultaneously with one control movement, i.e. operation of control lever 26. When both valves 27 and 29 are in their center positions (as valve 27 is drawn), the pumps supply no fluid to the cylinders, nor can any fluid escape from the cylinders to the reservoir 31. The weights of the tool 17, the hoist boom 6, stick boom 7, stick cylinder 11 and reach cylinder 16 all tend to pivot the entire boom assembly down around hoist-base pivot pin 8. The hoist cylinder 10 resists this rotation with a force from fluid pressure in its base end sufficient to match the loading moments.

Because conduit 114 connects the base end ports of the hoist cylinder 10 and the stick cylinder 11, the pressure provided by the hoist cylinder 10 to the base of the stick cylinder 11 is whatever is needed for the hoist cylinder 10 to support the entire boom, as just described. This hoist pressure acting in the stick cylinder 11 provides a moment about hoist-stick pivot pin 15, which opposes the downward moment of weights of the stick boom 7 and tool 17. If this stick cylinder moment is less than the loading, then reach cylinder 16 (being locked with trapped hydraulic fluid) develops enough base end pressure to produce a force that makes up the moment difference so that the stick and its tool do not pivot down. If the stick cylinder moment with its hoist-dictated pressure is more than needed at the hoist-stick pivot pin 15 to hold up the stick boom and the tool, then the reach cylinder will develop a rod end pressure to resist the excess.

Figure 2:
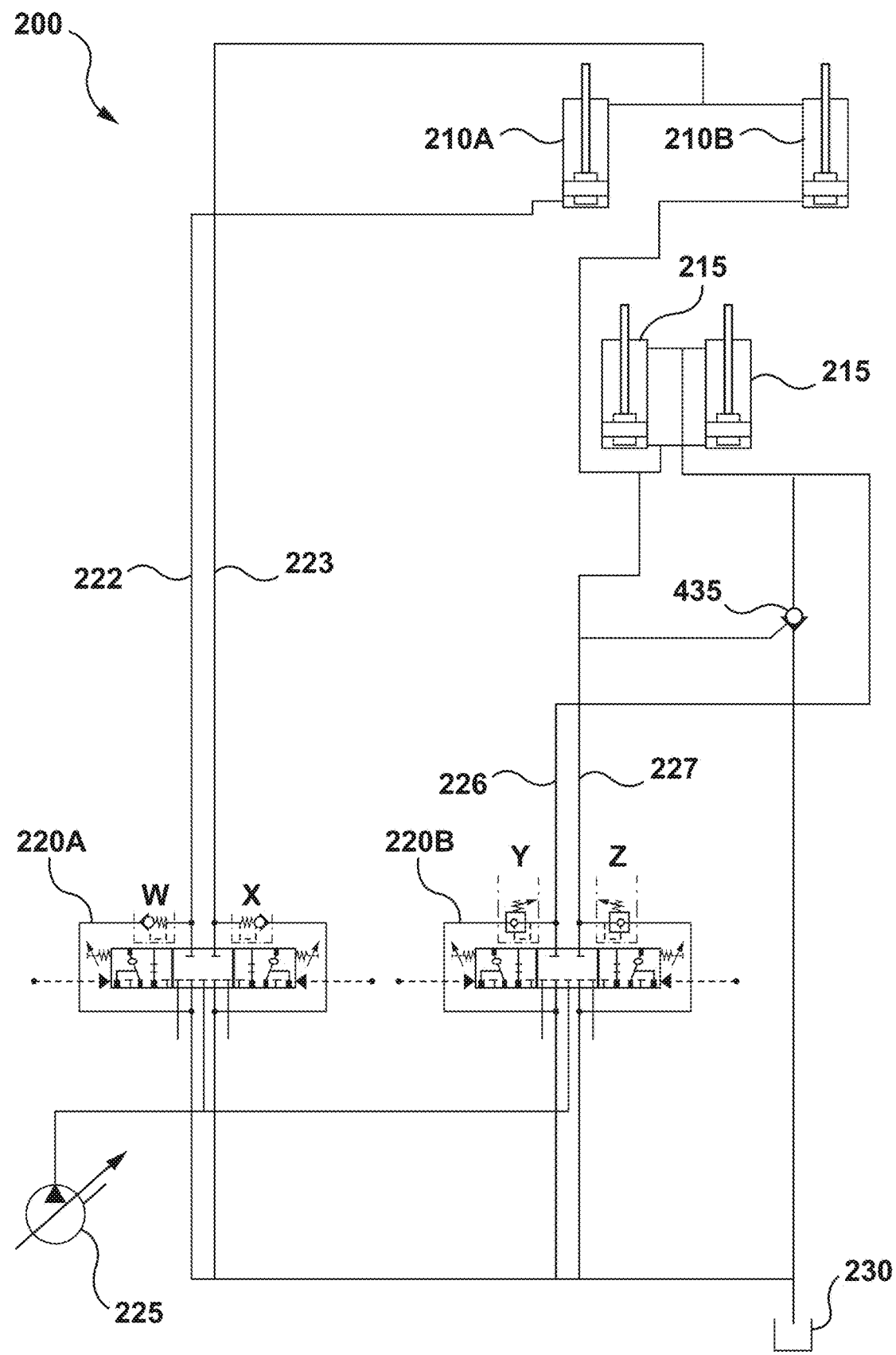
FIG. 2 is a simplified schematic of a hydraulic circuit according to an embodiment herein.

FIG. 2 illustrates a hydraulic circuit 200 according to an embodiment herein. The hydraulic circuit 200 of FIG. 2 can be used with the machine base 1 of FIG. 1 or similar, as will be understood by one of skill in the art.

As shown in FIG. 2, the hydraulic circuit 200 includes two stick cylinders 210A, 210B (similar to cylinders 11, 16 of FIG. 1) for the stick boom 7 that are mechanically linked, two hoist cylinders 215 (similar to cylinder 10 of FIG. 1) for the hoist boom 6, two hydraulic control valves 220A, 220B, a pump 225 and a tank 230 for hydraulic fluid. The two stick cylinders include a first stick cylinder 210A and a second stick cylinder 210B (sometimes referred to as the "ER cylinder"). The two hydraulic control valves include a first control valve 220A (sometimes called a stick cylinder valve) and a second control valve 220B (sometimes called a hoist cylinder valve). The two stick cylinders may be arranged as shown in FIG. 1 or may be arranged side by side or in other appropriate arrangements. In this embodiment, there are two hoist cylinders but in some embodiments there may be a single hoist cylinder or more than two hoist cylinders, depending on the application. Similar considerations apply to the stick cylinders.

The hydraulic circuit 200 also includes several lines/conduits connecting the elements. The first control valve 220A is directly connected to the first stick cylinder 210A at both base and rod ends by conduits 222, 223 and connected to the second stick cylinder 210B at the rod end only by conduit 223. The second control valve 220B is connected to the two hoist cylinders at both the base and rod ends by conduits 226, 227 and to the second stick cylinder 210B at the base end only by conduit 227. As such, the first stick cylinder 210A and the second stick cylinder 210B operate somewhat independently. The pump 225 is connected to the control valves 220A, 220B and to the tank 230 to allow flow of hydraulic fluid to and from the tank 230.

The hydraulic circuit of FIG. 2 is intended to provide additional functionality to that shown in FIG. 1. In particular, the hydraulic circuit (sometimes referred to as a Semi-ER circuit) generally maintains a similar path arrangement as the ER circuit of FIG. 1 but provides double the pulling force to the boom system (the pulling force is doubled due to pressurizing both rod ends of the first stick cylinder and the second stick cylinder). The hydraulic circuit of FIG. 2 also conserves energy when compared to conventional boom systems.

A high flow ER valve 235 is provided in the hydraulic circuit 200 on the line to the tank because, in this embodiment, all rod end fluid from the hoist cylinders now exchanges with the tank (instead of exchanging with the stick cylinder as it would generally do in the ER circuit of FIG. 1).

In this embodiment, twice the flow is required to retract the stick at the same speeds when compared to the ER circuit of FIG. 1 but twice the force is obtained. The ability to provide twice the force provides various advantages, including the ability to pull a machine out if the machine is stuck in mud or the like as well as the ability to more easily pull a load closer the machine, particularly, for example, if the load is downhill from the machine or is under other loads and needs to be pulled free.

In some embodiments, the high flow ER valve can also be configured as a check valve such that, when the tool or end of the stick boom is on the ground, pressure is relieved in the base ends of the cylinders, the ER valve will close and pressure will build in (or be added to) the rod ends to cause a portion of the machine base to lift off the ground for maintenance, rotation, or other purposes depending on the situation in the field.

Figure 3:
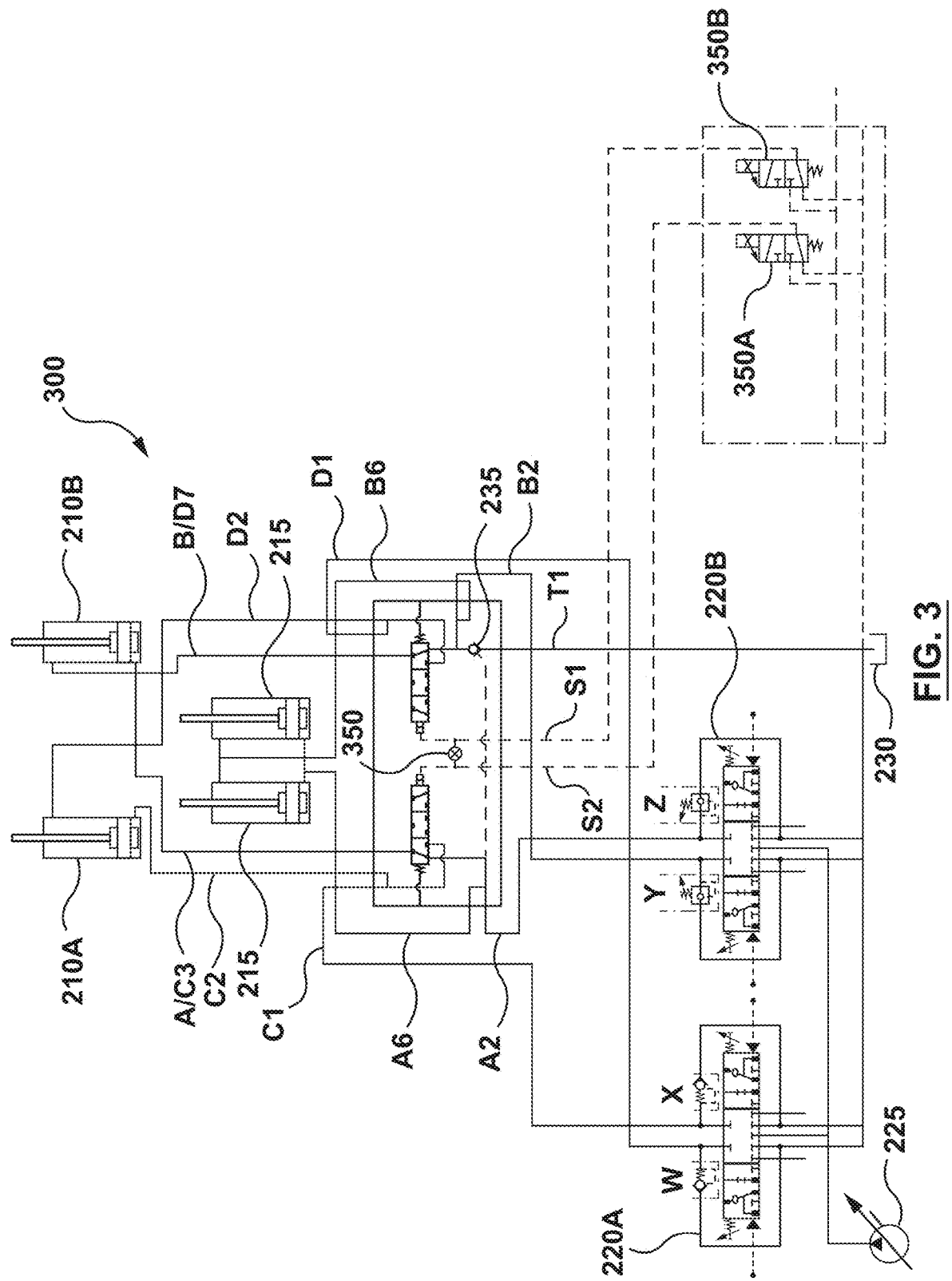
FIG. 3 is a simplified schematic of a hydraulic circuit according to another embodiment herein.

FIG. 3 illustrates a hydraulic circuit 300 according to another embodiment herein. As shown in FIG. 3, this embodiment is similar to that of FIG. 2 in that the hydraulic circuit includes two stick cylinders 210A, 210B for the stick boom 7, two hoist cylinders 215 for the hoist boom 6, two hydraulic control valves 220A, 220B, a pump 225, a tank 230 for hydraulic fluid and a high flow valve 235. In this embodiment, the hydraulic circuit 300 includes a switching manifold 340, which includes two cartridge valves 345A, 345B (sometimes called "switching valves") that provide independently switchable base and rod ends for the stick cylinders 210A, 210B. As will be understood by one of skill in the art, the switching valves may be the cartridge valves indicated or any other suitable switching mechanism.

As with the embodiment of FIG. 2, the circuit of FIG. 3 also includes several lines/conduits connecting the elements. The pump and the cylinders can be connected by the lines/conduits in various configurations by the settings of the cartridge valves 345A and 345B. In particular, the cartridge valves 345A and 345B allow for independently switching base and rod ends of the second stick cylinder.

In a conventional-mode setting, cartridge valve 345A is set such that the stick cylinder valve 220A controls both the base and rod ends of the stick cylinders 210A and 210B (i.e. W flows through to ports/lines D2 and D7 to connect with both rod ends of the stick cylinders and X flows through to ports/lines C2 and C3 to connect with both base ends of the stick cylinders) and the hoist cylinder valve 220B controls both the base and rod ends of the hoist cylinders 215 (i.e. Y flows through to port/line B6 to connect with both rod ends of the hoist cylinders and Z flows through to port/line A6 to connect with both base ends of the hoist cylinders). This mode (sometimes called a "standard mode") is how a conventional boom would typically have operated prior to the developments of the patents noted above. It can be useful for operators that are used to this mode of operation and/or for situations where additional force may be needed when pulling/pushing with the boom.

In a semi-ER mode, similar to FIG. 2, the control valves 345A, 345B are configured such that the first control valve 220A is connected to the first stick cylinder 210A at both base and rod ends connected to the second stick cylinder 210B at the rod end only (i.e. W flows through to port/lines D2 and D7 to connect with both rod ends of the stick cylinders and X flows through to port/line C2 to connect with both base end of the first stick cylinder) and the second control valve 220B is connected to the two hoist cylinders at both the base and rod ends and to the second stick cylinder 210B at the base end only (i.e. Y flows through to port/line B6 to connect with both rod ends of the hoist cylinders and Z flows through to port/line A6 to connect with both base ends of the hoist cylinders). This mode has the advantages described above with regard to FIG. 2.

In ER mode, similar to FIG. 1, the control valves 345A, 345B are configured such that the first control valve 220A is connected to the first stick cylinder 210A at both base and rod ends and not connected to the second stick cylinder 210B (i.e. W flows through to port/line D2 to connect with the rod end of the second stick cylinder and X flows through to port/line C2 to connect with the base end of the first stick cylinder) and the second control valve 220B is connected to the two hoist cylinders at both the base and rod ends and to the second stick cylinder 210B at both the base and rod ends (i.e. Y flows through to port/line B6 and B/D7 to connect with both rod ends of the hoist cylinders and the rod end of the second stick cylinder and Z flows through to ports/lines A6 and A/C3 to connect with both base ends of the hoist cylinders and the base end of the second stick cylinder). The ER mode provides energy conservation as described in the noted patents, is easier to learn because raise and reach operations are independently controlled.

Similar to FIG. 2, in FIG. 3, the pump 225 is connected to the control valves 220A, 220B and to the tank 230 to allow flow of hydraulic fluid to and from the tank 230.

The hydraulic circuit of FIG. 3 is intended to provide additional functionality to that shown in FIG. 2. In particular, the hydraulic circuit (sometimes referred to as a three mode ER circuit) allows for easily switching among the three modes of operation described. In this way, an operator can select the most appropriate mode for the particular task being undertaken.

In some embodiments, the hydraulic circuit 300 may include pilot valves 350A and 350B that control the cartridge valves in the manifold. In this case, the pilot valves 350A, 350B are connected to the cartridge valves 345A and 345B via ports/lines S1 and S2 on the manifold. In some cases, particularly if there is a retrofit of an existing system, the lines S1 and S2 may have a plug 350 placed between them to provide for independent operation of the cartridge valves 345A and 345B. One of skill in the art will understand that the cartridge valves or boom valves may alternatively or also be computer controlled, for example, using a mechanical servo or the like. Further, it will be understood that the concept of taking energy from a collapsing cylinder and using it to raise an extending cylinder can be employed by computer programming closed loop pumps to pump or remove fluid at the right time. In some cases, there may also be an analogous capture of mechanical energy by the engine from one pump and use of it in another.

Figure 4:
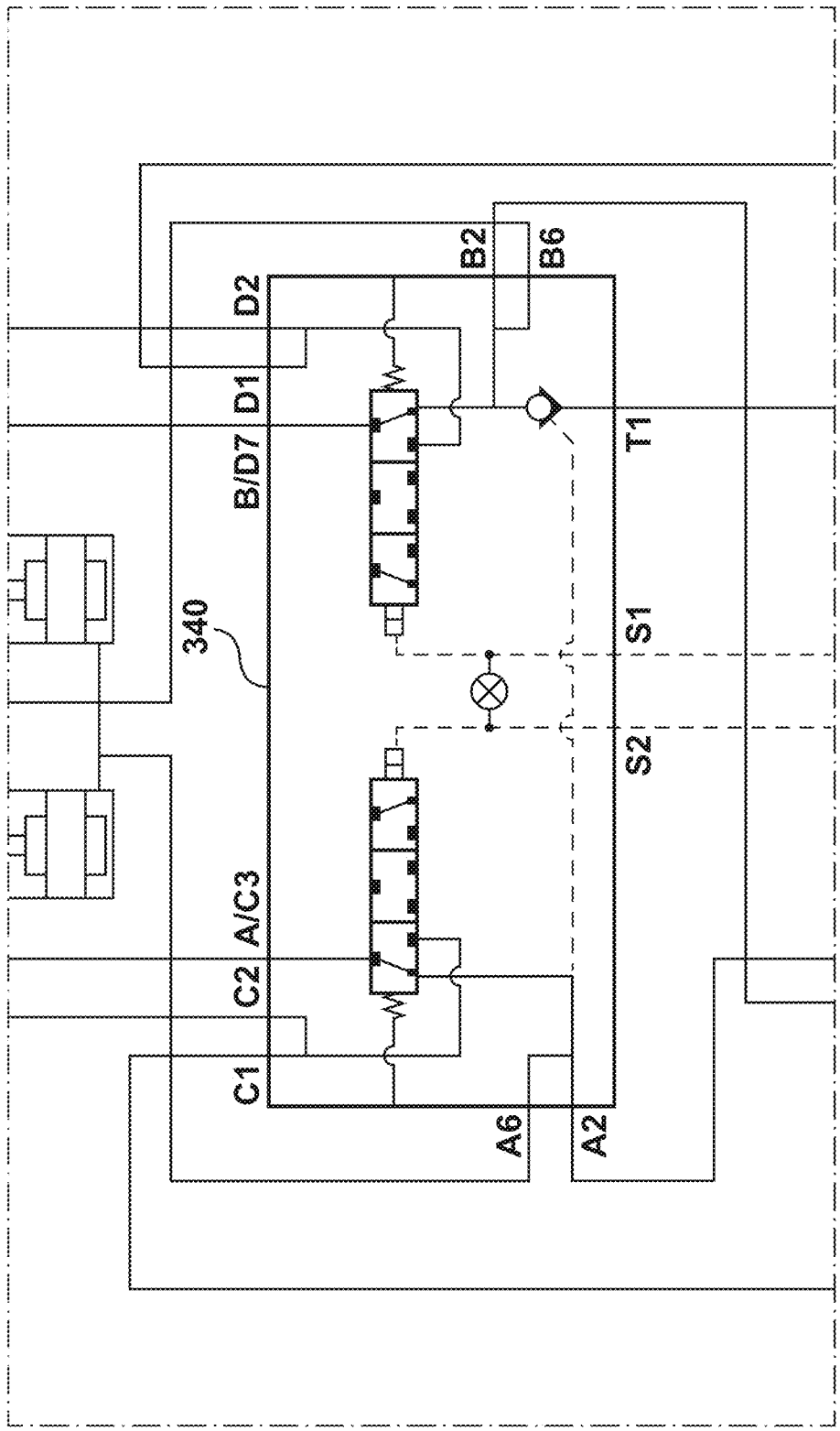
FIG. 4 is an enlarged view of a manifold of the hydraulic circuit of FIG. 3.

FIG. 4 shows a larger view of the manifold 340 of FIG. 3. FIG. 4 illustrates the ports/lines on the manifold 340 and the switching valves 345A and 345B.

Figure 5:
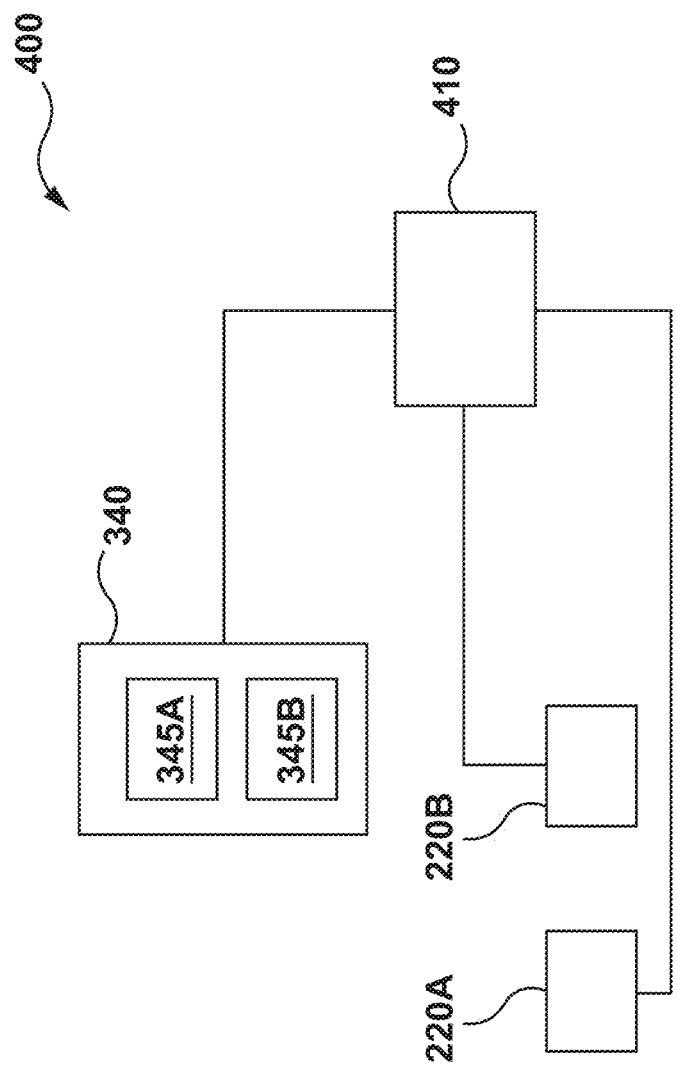
FIG. 5 is a block diagram of a control system according to an embodiment herein.

FIG. 5 shows an embodiment of a control system 400 for controlling the cylinder valves and the manifold (including the cartridge valves). A controller 410, which may include a computer processor and memory as well as software (computer instructions), is provided in communication with each of the stick cylinder valve 220A and the hoist cylinder valve 220B as well as the manifold 340. As noted herein, the controller may control the valves via hydraulic, mechanical, or other control methods as are known to one of skill in the art. In some embodiments, a separate controller may be provided for each of the stick cylinder valve 220A, hoist cylinder valve 220B and for the manifold 340 (switching valves 345A, 345B). The controller for the manifold (switching valves 345A, 345B) may be a toggle type switch or the like, allowing for switching among modes. Whereas the controller for the stick cylinder valve and/or hoist cylinder valve may be one or more control handles/levers or the like, allowing for control of the lift and reach of the boom. Any controller may include computer software that activates hydraulic or mechanical devices or the like to control the various valves.

In some embodiments or modes, even though during normal operations no load is supported by the rod-end fluid, there may be situations in which it is preferred to be able to pressurize the rod ends, for example, so that the boom is also usable for pushing down with its tool end in certain operating and maintenance situations. This situation can be provided by appropriate control of the valves in each of the embodiments of FIGS. 2 and 3.

It will be understood that, although the preceding discussion assumes the base ends of the hoist and stick cylinders to be the working ends, it is sometimes desirable to use the rod ends under pressure. A typical boom hydraulic cylinder necessarily has a rod end effective piston area that is only about one half of its base piston area. Hence for cylinder economy size and weight and fluid flow needs nearly all hydraulic boom configurations are selected with the base areas being the working ends, i.e. doing the work of supporting the boom weight and the load. Sometimes however for particular work it is desirable to have the higher cylinder force pushing/working in a particular direction on the boom.

In embodiments herein, cylinder sizes and their acting geometry are selected using knowledge in the industry, so that when the system is operated the loads can be supported as appropriate for the particular application.

In the preceding description, for purposes of explanation, numerous details are set forth in order to provide a thorough understanding of the embodiments. However, it will be apparent to one skilled in the art that these specific details may not be required in order to practice the invention. In other instances, well-known structures, such as electrical circuits or the like, may be shown in block diagram form in order not to obscure the invention. For example, specific details are not provided as to whether the embodiments described herein are implemented as a software routine, hardware circuit, firmware, or a combination thereof.

In some embodiments, some elements may be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment. Those of ordinary skill in the art will appreciate that other instructions and operations necessary to implement the described embodiments can also be stored on the machine-readable medium. Software running from the machine-readable medium can interface with circuitry to perform the described tasks.

The above-described embodiments are intended to be examples only. In particular, elements of one embodiment can be used with other embodiments and elements in an embodiment may not be required but are included for illustrative purposes. Alterations, modifications and variations can be effected to the particular embodiments by those of skill in the art without departing from the scope of the invention, which is defined solely by the claims appended hereto.

What is claimed is:

1. A boom system for a machine base, the system comprising:
   a hoist boom having a proximal end pivoted to the machine base, and a distal end remote therefrom;
   a stick boom having a proximal end pivoted to the distal end of the hoist boom and a distal end configured to carry a working tool;
   at least one hydraulic hoist cylinder mounted between the machine base and the hoist boom;
   a first stick cylinder mounted between the hoist boom and the stick boom;
   a second stick cylinder mounted between the hoist boom and the stick boom and mechanically linked with the first stick cylinder;
   a control system; and
   a hydraulic circuit for operatively supplying hydraulic fluid to the hoist cylinder and stick cylinders, wherein the hydraulic circuit comprises:
      at least two switching valves controlled by the control system; and
      at least two control valves,
      wherein the at least two switching valves are controlled by the control system to set the at least two control valves to provide at least three modes of operation comprising: a standard mode, an ER mode and a semi-ER mode.

2. The boom system of claim 1 further comprising a high flow valve on a line returning hydraulic fluid to a fluid tank.

3. The boom system of claim 1 wherein the at least two control valves comprise a first cylinder valve for controlling fluid flow to the first stick cylinder and to a rod end port of the second stick cylinder, and a second cylinder valve for controlling fluid flow to the at least one hoist cylinder and to the base end port of the second stick cylinder.

4. The boom system of claim 1 wherein the at least one hoist cylinder comprises two or more hoist cylinders.

5. The boom system of claim 1 wherein the semi-ER mode of operation comprises the at least two switching valves being controlled such that a base end port of the at least one hoist cylinder is connected with the base end port of the second stick cylinder so as to allow hydraulic fluid to shunt between the base end of the at least one hoist cylinder and the second stick cylinder.

6. The boom system of claim 1 wherein the ER mode of operation comprises the two switching valves being controlled such that the base end port of the at least one hoist cylinder is connected with a base end port of the second stick cylinder so as to allow hydraulic fluid to shunt between the base end port of the at least one hoist cylinder and the base end port of the second stick cylinder and the rod end port of the at least one hoist cylinder is connected with a rod end port of the second stick cylinder so as to allow hydraulic fluid to shunt between the rod end port of the at least one hoist cylinder and the rod end port of the second stick cylinder.

7. The boom system of claim 1 further comprising a manifold for housing the switching valves.

8. The boom system of claim 7 wherein the manifold further houses a high flow valve on a line returning hydraulic fluid to a fluid tank.

9. A heavy equipment machine comprising:
   a machine base;
   a hoist boom having a proximal end pivoted to the machine base, and a distal end remote therefrom
   a stick boom having a proximal end pivoted to the distal end of the hoist boom and a distal end configured to carry a working tool;
   at least one hydraulic hoist cylinder mounted between the machine base and the hoist boom;
   a first stick cylinder mounted between the hoist boom and the stick boom;
   a second stick cylinder mounted between the hoist boom and the stick boom;
   a control system; and
   a hydraulic circuit for operatively supplying hydraulic fluid to the hoist and stick cylinders, wherein the hydraulic circuit comprises:
      at least two switching valves controlled by the control system; and
      at least two control valves,
      wherein the at least two switching valves are controlled by the control system to set the at least two control valves to provide at least three modes of operation comprising: a standard mode, an ER mode and a semi-ER mode.

10. The heavy equipment machine of claim 9 further comprising a high flow valve on a line returning hydraulic fluid to a fluid tank.

11. The heavy equipment machine of claim 9 wherein the at least two control valves comprise a first cylinder valve for controlling fluid flow to the first stick cylinder and to a rod end port of the second stick cylinder, and a second cylinder valve for controlling fluid flow to the at least one hoist cylinder and to the base end port of the second stick cylinder.

12. The heavy equipment machine of claim 9 wherein the at least one hoist cylinder comprises two or more hoist cylinders.

13. The heavy equipment machine of claim 9 wherein the semi-ER mode of operation comprises the at least two switching valves being controlled such that a base end port of the at least one hoist cylinder is connected with the base end port of the second stick cylinder so as to allow hydraulic fluid to shunt between the base end of the at least one hoist cylinder and the second stick cylinder.

14. The heavy equipment machine of claim 9 wherein the ER mode of operation comprises the two switching valves being controlled such that the base end port of the at least one hoist cylinder is connected with each of a base end port of the first and the base end port of the second stick cylinder so as to allow hydraulic fluid to shunt between the base end port of the at least one hoist cylinder and the first and second stick cylinders.

15. The heavy equipment machine of claim 9 further comprising a manifold for housing the switching valves and the manifold further houses a high flow valve on a line returning hydraulic fluid to a fluid tank.

16. A method for operating a boom of a heavy equipment machine, the method comprising:

selecting, via a controller, a mode of operation, wherein the modes of operation comprise: a standard mode, an ER mode and a semi-ER mode; and adjusting, via the controller, one or more valves to configure the one or more valves for the selected mode of operation.

17. The method of claim 16 wherein the adjusting comprises switching a flow of hydraulic fluid from a rod end to a base end of one or more stick cylinders via a cartridge valve.

\* \* \* \* \*